(12) United States Patent
O'Connor et al.

(10) Patent No.: US 9,444,681 B2
(45) Date of Patent: Sep. 13, 2016

(54) SYSTEMS AND METHODS FOR RESOLUTION OF UNIFORM RESOURCE LOCATORS IN A LOCAL NETWORK

(71) Applicant: Dell Products L.P., Round Rock, TX (US)

(72) Inventors: Clint H. O'Connor, Austin, TX (US); Gary Douglas Huber, Austin, TX (US); Richard W. Schuckle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 14/169,315

(22) Filed: Jan. 31, 2014

(65) Prior Publication Data

US 2015/0222589 A1    Aug. 6, 2015

(51) Int. Cl.
| | |
|---|---|
| *H04L 12/28* | (2006.01) |
| *H04L 12/24* | (2006.01) |
| *G06F 17/30* | (2006.01) |
| *H04L 29/12* | (2006.01) |

(52) U.S. Cl.
CPC ..... *H04L 41/0806* (2013.01); *G06F 17/30861* (2013.01); *H04L 61/15* (2013.01); *H04L 61/303* (2013.01); *H04L 61/3015* (2013.01)

(58) Field of Classification Search
USPC .......... 370/252–255, 351–463; 709/221–245
See application file for complete search history.

(56) References Cited

U.S. PATENT DOCUMENTS

| | | | | |
|---|---|---|---|---|
| 6,941,370 B2 * | 9/2005 | Boies | ................ | G06F 17/30067 707/E17.01 |
| 7,080,138 B1 * | 7/2006 | Baker | ............... | H04L 29/12066 370/232 |
| 7,444,428 B1 * | 10/2008 | Kuo | ................. | H04L 29/12113 370/241 |
| 7,653,747 B2 * | 1/2010 | Lucco | ............... | H04L 29/12066 709/203 |
| 7,822,871 B2 * | 10/2010 | Stolorz | ............... | H04L 12/2602 709/202 |
| 7,904,541 B2 * | 3/2011 | Swildens | ................ | G06F 9/505 709/202 |
| 8,040,819 B2 * | 10/2011 | Harrington | ......... | H04L 12/2856 370/254 |
| 8,732,268 B2 * | 5/2014 | Huang | ................ | H04L 61/1511 709/217 |
| 2003/0069968 A1 * | 4/2003 | O'Neil | ................ | H04L 67/1008 709/225 |
| 2005/0066041 A1 * | 3/2005 | Chin | ................... | H04L 12/4641 709/228 |
| 2013/0254423 A1 * | 9/2013 | George, IV | ......... | H04L 61/1511 709/238 |
| 2014/0366117 A1 * | 12/2014 | Kumar | .................... | H04L 63/02 726/11 |

* cited by examiner

*Primary Examiner* — Man Phan
(74) *Attorney, Agent, or Firm* — Jackson Walker L.L.P.

(57) ABSTRACT

In accordance with embodiments of the present disclosure, a method for resolving a uniform resource locator may include receiving, at a router, a uniform resource locator from a client information handling system within a local network of the router. The method may also include processing, by the router, the uniform resource locator to determine if the uniform resource locator includes a local domain name of a local information handling system within the local network. The method may further include resolving, by the router, a unique address associated with the uniform resource locator and the local information handling system responsive to determining that the uniform resource locator includes the local domain name of the local information handling system, wherein such resolving is performed without resort to a domain name service external to the local network.

17 Claims, 3 Drawing Sheets

SYSTEMS AND METHODS FOR RESOLUTION OF UNIFORM RESOURCE LOCATORS IN A LOCAL NETWORK

TECHNICAL FIELD

The present disclosure relates in general to information handling systems, and more particularly, to intelligently provisioning a local network including a network router to resolve uniform resource locators for one or more information handling systems of the local network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, the use and proliferation of cloud computing solutions has increased. Cloud computing may generally refer to distributed computing over a network, including the ability to execute a program or application on many connected computers at the same time. Cloud computing may also refer to network-based services, which appear to be provided by real server hardware, and are in fact served up by virtual hardware, simulated by software running on one or more real machines. While many traditional cloud computing platforms use the Internet in order to perform distributed computing, individuals and businesses are increasingly employing local networks, such as home networks and corporate intranets, wherein a cloud server within the local network provides cloud-based applications and/or services to client information handling systems within the local network. By allowing for application and service streaming to be performed by a local cloud server, streaming between the cloud server and individual client information handling systems may utilize higher network speeds and experience less latency as compared to traditional approaches in which a cloud server is Internet-based.

In a local-network cloud-based approach, a cloud server and client information handling systems must be able to address each other. Also, from a user-experience standpoint, addressing the cloud server from a client information handling system should be user friendly. Thus, in order to access the cloud server, it may be desirable to allow a user of a client information handling system to enter into a web browser or other application a Uniform Resource Locator (URL) having a user-friendly domain name (e.g., mygames.local), and not an Internet Protocol (IP) address (e.g., 192.168.1.101) for the cloud server. Typically, resolution of URLs is performed by a domain name service (DNS), an Internet-based service which translates domain names included within URLs into IP addresses, allowing resources (e.g., web pages, files, applications, etc.) to be accessed via a URL.

However, DNS may not be a desirable manner in which to perform domain name resolution for local cloud networks. Because DNS typically requires an Internet connection, DNS may not be desirable for a local cloud-based network in the event that the local network cannot access the Internet. In addition, because many such local cloud servers should not be accessible by client information handling systems outside of the local network, and the fact that such local network cloud servers may not have universally unique names (e.g., the domain name "mygames.local" may exist at numerous customer locations), DNS would not be an effective manner in which to perform resolution.

SUMMARY

In accordance with the teachings of the present disclosure, the disadvantages and problems associated with resolution of uniform resource locators in a local network may be reduced or eliminated.

In accordance with embodiments of the present disclosure, a method for resolving a uniform resource locator may include receiving, at a router, a uniform resource locator from a client information handling system within a local network of the router. The method may also include processing, by the router, the uniform resource locator to determine if the uniform resource locator includes a local domain name of a local information handling system within the local network. The method may further include resolving, by the router, a unique address associated with the uniform resource locator and the local information handling system responsive to determining that the uniform resource locator includes the local domain name of the local information handling system, wherein such resolving is performed without resort to a domain name service external to the local network.

In accordance with these and other embodiments of the present disclosure, a method for registering a local domain name with a router may include receiving, by the router, from an information handling system a request to register with the router the information handling system and a local domain name associated with the information handling system. The method may also include responsive to the request, processing the request, by the router, to determine if the request satisfies one or more conditions for registration. The method may further include responsive to determining that the request satisfies the one or more conditions for registration, registering with the router the local information handling system and the local domain name associated with the local information handling system.

In accordance with these and other embodiments of the present disclosure, a method may include during initialization of a router, determining, by the router, a user-friendly domain name to be associated with the router. The method may also include registering, by the router, the user-friendly domain name to be associated with a unique address of the router.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
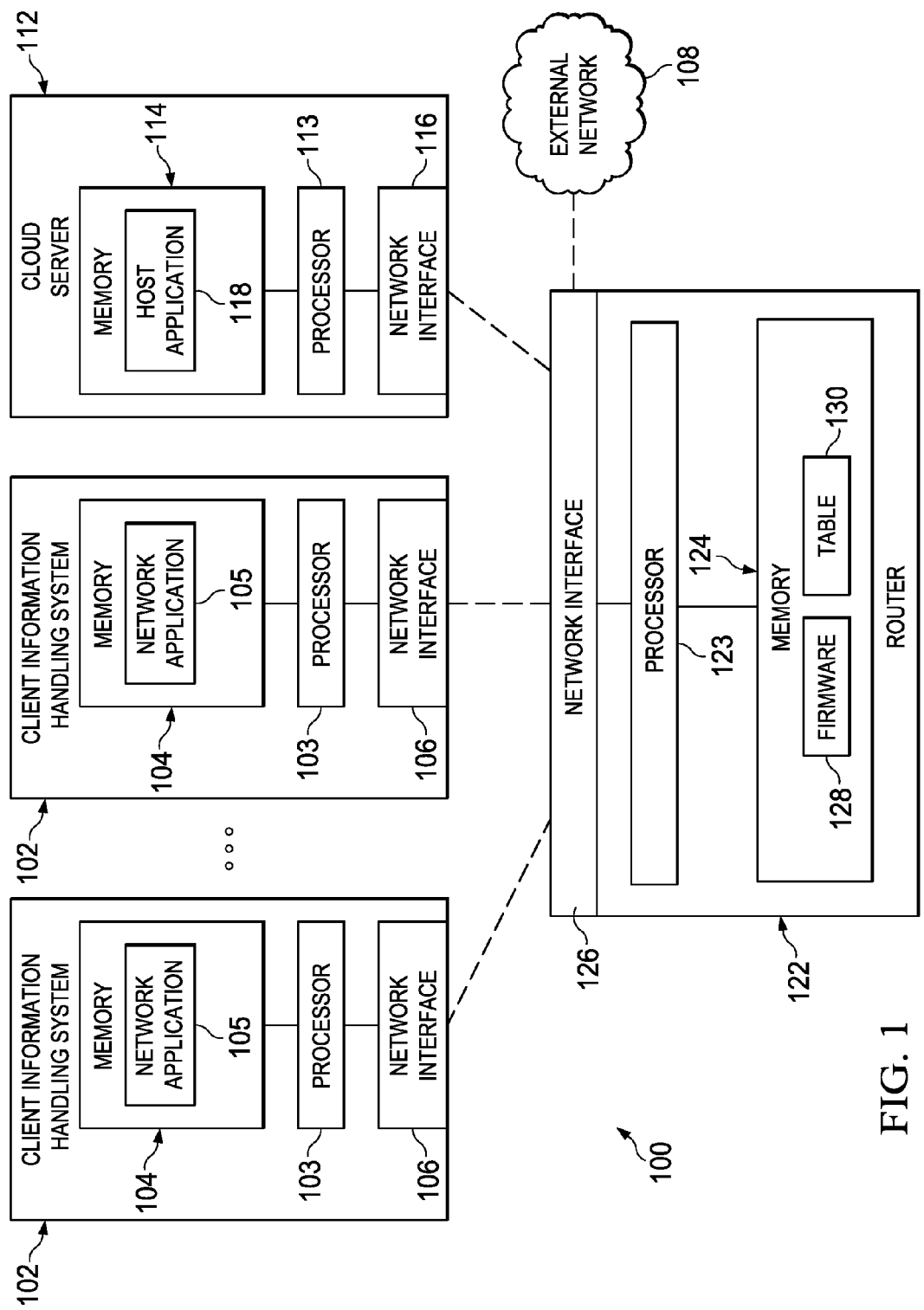
FIG. 1 illustrates a block diagram of an example local cloud network for enabling cloud-based streaming to one or more client information handling systems, in accordance with the teachings of the present disclosure.

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, near field communication (NFC), radio frequency identification (RFID), proximity card, vicinity card, ISO 14443, and ISO 15693.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example local cloud network 100 for enabling cloud-based streaming to one or more client information handling systems 102, in accordance with the teachings of the present disclosure. As depicted, network 100 may include one or more client information handling systems 102 (which may also be referred to herein as "clients 102" or individually as a "client 102"), a cloud server 112, a router 122, and an external network 108.

Each client information handling system 102 may generally be configured to communicate via external network 108 and client server 112 via router 122. In certain embodiments, one or more of clients 102 may be a personal computer (e.g., a desktop computer or a portable computer). In these and other embodiments, one or more of clients 102 may be a mobile device (e.g., smartphone, tablet computer, personal digital assistant, etc.). As depicted in FIG. 1, each client 102 may include a processor 103, a memory 104 communicatively coupled to processor 103, and a network interface 106 communicatively coupled to processor 103. Although network 100 is depicted as having two clients 102, network 100 may include any suitable number of clients 102.

Each processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in its associated memory 104 and/or another information handling resource of its associated client 102.

Each memory 104 may be communicatively coupled to its associated processor 103 and may include any system, device, or apparatus configured to retain program instructions and/or data for a period of time (e.g., computer-readable media). Each memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated client 102 is turned off.

As shown in FIG. 1, a memory 104 may have stored thereon a network application 105. A network application 105 may comprise a program of one or more instructions configured to, when read and executed by processor 103, communicate data to and/or from another information handling system remote from its associated information handling system 102 (e.g., cloud server 112 or an information handling system of external network 108).

Each network interface 106 may include any suitable system, apparatus, or device operable to serve as an interface between its associated client 102 and router 122. Each network interface 106 may enable its associated client 102 to communicate via router 122 using any suitable transmission protocol and/or standard.

Cloud server 112 may comprise an information handling system and may generally be operable to communicate via router 122 with one or more of clients 102. As depicted in FIG. 1, each provisioning server 112 may include a processor 113, a memory 114 communicatively coupled to processor 113, and a network interface 116 communicatively coupled to processor 113. Each processor 113, memory 114, and network interface 116 may be similar or identical in structure and/or functionality to processor 103, memory 104, and network interface 106, respectively. Although network 100 is depicted as having one cloud server 112, network 100 may include any suitable number of cloud servers 112.

As shown in FIG. 1, memory 114 may have stored thereon a host application 118. Host application 118 may comprise a program of one or more instructions configured to, when read and executed by processor 113, facilitate streaming of applications and/or services to clients 102. For example, in some embodiments host application 118 may comprise a web server application configured to receive requests for streaming applications and/or services from clients 102 and stream applications and/or services responsive to such requests.

Router 122 may comprise any suitable system, device, or apparatus for communicating data between clients 102 and cloud server 112, clients 102 and external network 108, and/or cloud server 112 and external network 108. Router 122 may be communicatively coupled to and may communicate with clients 102, cloud server 112, and external network 108 via wireless and/or wire-line transmissions. As depicted in FIG. 1, router 122 may include a processor 123, a memory 124 communicatively coupled to processor 123, and a network interface 126 communicatively coupled to processor 123. Each processor 123, memory 124, and network interface 126 may be similar or identical in structure and/or functionality to processor 103, memory 104, and network interface 106, respectively.

In operation, clients 102, cloud server 112, and router 122 may be configured as part of a local network, wherein router 122 serves as a gateway between components of the local network to components outside of or remote from the local network. For example, router 122, clients 102, and cloud server 112 may be part of the same IP subnet. In these and other embodiments, information handling systems within such local network may have greater access privileges to other components of the local network as compared to components remote from the local network. For example, as described in greater detail below, clients 102 may be able to access cloud server 112 with a URL having a local user-friendly domain name, while information handling systems external to the local network and coupled to external network 108 may not be able to access cloud server 112 using the same local domain name.

As shown in FIG. 1, memory 124 may include firmware 128 and table 130. Firmware 128 may include a program of instructions configured to, when read and executed by processor 123, facilitate translation of URLs including local user-friendly domain names into IP addresses of information handling systems (e.g., cloud server 112, router 122). As part of such functionality, firmware 128 may manage and access table 130. Table 130 may comprise a list, map, array, database, or other data structure which associates domain names of information handling systems of the local network of router 122 into IP addresses. Accordingly, router 122 may, by performing a look-up into table 130, resolve URLs for information handling systems of its local network without relying on DNS.

External network 108 may be a network and/or fabric configured to couple information handling systems of the local network of router 122 to information handling systems remote from the local network. Thus, clients 102 may be able to access, via router 122, network resources other than those of cloud server 112. In addition, cloud server 112 may be able to access external network 108 to update its content and/or perform other tasks.

Figure 2:
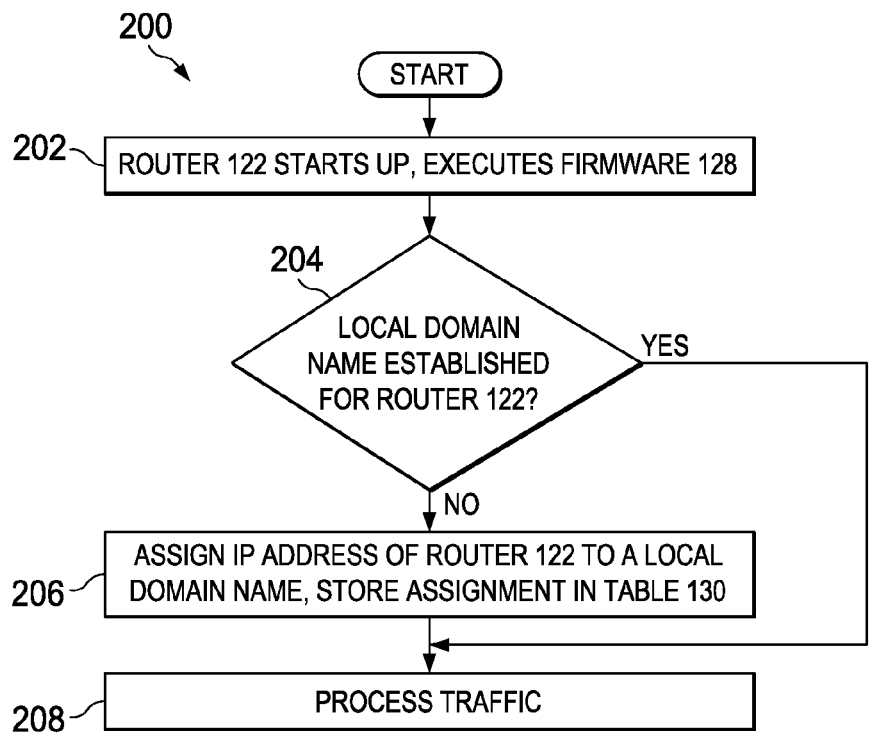
FIG. 2 illustrates a flow chart of an example method for initializing a router, in accordance with embodiments of the present disclosure.

FIG. 2 illustrates a flow chart of an example method 200 for initializing a router 122, in accordance with embodiments of the present disclosure. According to certain embodiments, method 200 may begin at step 202. As noted above, teachings of the present disclosure may be implemented in a variety of configurations of network 100. As such, the preferred initialization point for method 200 and the order of the steps comprising method 200 may depend on the implementation chosen.

At step 202, router 122 may start up, and may execute firmware 128. At step 204, firmware 128 may determine if a local domain name has been established for router 122 (e.g., a local domain name does not exist in table 130 for router 122). A local domain name may not exist for router 122 during its first start up or its first start up after a factory reset or similar reset of router 122. In response to determining a local domain name for router 122 does not exist, method 200 may proceed to step 206. Otherwise, method 200 may proceed to step 208.

At step 206, firmware 128 may assign the IP address of router 122 to a local domain name, and store such assignment in table 130. In some embodiments, such local domain name may be a factory default name (e.g., myrouter.local). In other embodiments, such local domain name may be in accordance with a user or manufacturer setting that sets forth a default local domain name (e.g., supplied on an external memory coupled to router 122 during the initialization process).

At step 208, router 122 may process received traffic in accordance with its normal operation.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using network 100, components thereof, and/or any other system operable to implement method 200. In certain embodiments, method 200 may be implemented partially or fully in software and/or firmware embodied in computer-readable media.

Figure 3:
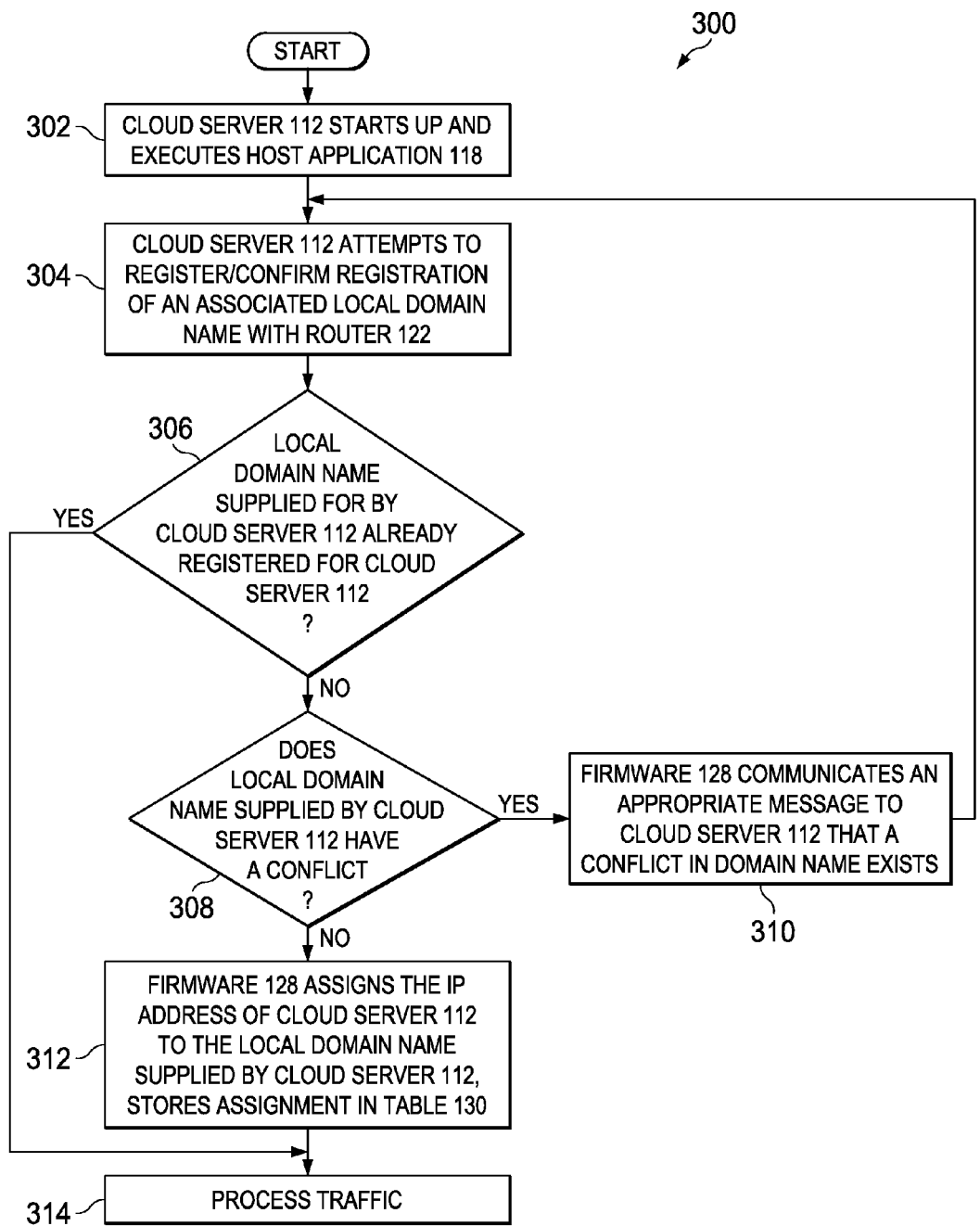
FIG. 3 illustrates a flow chart of an example method for registering a cloud server in a local network, in accordance with embodiments of the present disclosure.

FIG. 3 illustrates a flow chart of an example method 300 for registering a cloud server 112 in a network local to a router, in accordance with embodiments of the present disclosure. According to certain embodiments, method 300 may begin at step 302. As noted above, teachings of the present disclosure may be implemented in a variety of configurations of network 100. As such, the preferred initialization point for method 300 and the order of the steps comprising method 300 may depend on the implementation chosen.

At step 302, cloud server 112 may start up and execute host application 118. At step 304, cloud server 112 may attempt to register or confirm registration of an associated local domain name with router 122 by communicating an appropriate message, and/or supplying an appropriate URL to router 122 (e.g., myrouter.local?register="myserver.local"). In some embodiments, such local domain name may be a factory default name (e.g., myserver.local). In other embodiments, such local domain name may be in accordance with a user or manufacturer setting that sets forth a default local domain name (e.g., supplied on an external memory coupled to router 122 during the initialization process).

At step 306, router 122 may receive the registration/confirmation attempt from cloud server 112 and firmware 128 may determine whether the local domain name supplied for by cloud server 112 is already registered (e.g., whether such domain name appears in table 130) and associated with the IP address of cloud server 112. If the local domain name supplied by cloud server 112 is already registered and associated with the IP address of cloud server 112, method 300 may proceed to step 314. Otherwise, method 300 may proceed to step 308.

At step 308, firmware 128 may determine if the local domain name has a conflict. For example, firmware 128 may determine if the domain supplied by cloud server 112 is already registered but associated with an IP address other than that of cloud server 112 (e.g., associated with another cloud server 112 as set forth in table 130). In these and other embodiments, such conflict determination may comprise firmware 128 determining (e.g., via DNS lookup) if such domain name already exists for an IP address external to the local network of router 122. If the local domain name supplied by cloud server 112 has conflict, method 300 may proceed to step 310. Otherwise, method 300 may proceed to step 312.

At step 310, in response to determining that the local domain name supplied by cloud server 112 is already registered but associated with an IP address other than that of cloud server 112, firmware 128 may communicate an appropriate message to cloud server 112 that a conflict in domain name exists. In response to such message, cloud server 112 may attempt to register another local domain name, and accordingly, after completion of step 310, method 300 may proceed again to step 304.

At step 312, responsive to determining that the local domain name supplied by cloud server 112 is available, firmware 128 may assign the IP address of cloud server 112 to the local domain name supplied by cloud server 112, and store such assignment in table 130. In some embodiments, firmware 128 may also delete any existing entry of table 130 including the IP address of cloud server 112, such that the IP address of cloud server 112 appears only once in table 130. After completion of step 312, method 300 may proceed to step 314.

At step 314, router 122 may process received traffic in accordance with its normal operation.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using network 100, components thereof, and/or any other system operable to implement method 300. In certain embodiments, method 300 may be implemented partially or fully in software and/or firmware embodied in computer-readable media.

Although not set forth above in method 300, in some embodiments, router 122 may be configured with certain security measures with regard to registration of local domain names. For example, in some embodiments, firmware 128 may be configured to reject or ignore registration requests that come from outside the local network of router 122 (e.g., requests coming from an information handling system outside the IP subnet of router 122). In these and other embodiments, firmware 128 may reject or ignore registration requests that attempt to register an IP address not within the local network of (e.g., not within the IP subnet of) router 122. In these and other embodiments, firmware 128 may be configured to require that any registration request include a password or other shared secret of router 122. Furthermore, in these and other embodiments, firmware 128 may be configured to register only those domain names which do not end with a top-level domain recognized and managed by the Internet Corporation for Assigned Names and Numbers (ICANN). For example, firmware may register domain names with a top-level domain of .local, .myserver, or other such name, but will reject or ignore requests to register domain names with top-level domains of .com, .net, .edu, .org., .us, .ca., .mx, or other ICANN-recognized top-level domain names.

Figure 4:
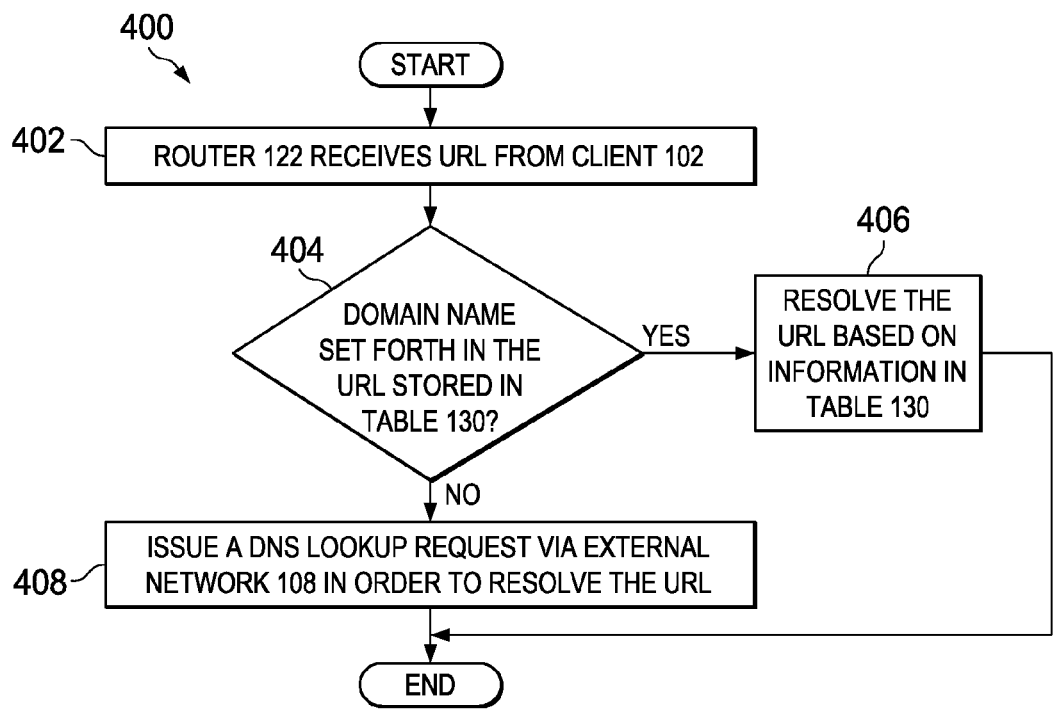
FIG. 4 illustrates a flow chart of an example method for resolving a URL having a user-friendly local domain name, in accordance with embodiments of the present disclosure.

FIG. 4 illustrates a flow chart of an example method 400 for resolving a URL having a user-friendly local domain name, in accordance with embodiments of the present disclosure. According to certain embodiments, method 400 may begin at step 402. As noted above, teachings of the present disclosure may be implemented in a variety of configurations of network 100. As such, the preferred initialization point for method 400 and the order of the steps comprising method 400 may depend on the implementation chosen.

At step 402, router 122 may receive a URL from a client 102. At step 404, firmware 128 may determine if a domain name set forth in the URL is stored in table 130. If the domain name is not present in table 130, method 400 may proceed to step 408. If the domain name is present in table 130, method 400 may proceed to step 406.

At step 406, in response to determining that the domain name is present in table 130, thus indicating a local information handling system (e.g., cloud server 122) having the local domain name has been registered with router 122, firmware 128 may resolve the URL based on information in table 130, thus allowing the client 102 providing the URL to access the resource on the local information handling system identified by the URL.

At step 408, firmware 128 may issue a DNS lookup request via external network 108 in order to resolve the URL. If the DNS lookup is successful in resolving the URL, the client 102 providing the URL may access the resource of external network 108 identified by the URL. Otherwise, if DNS lookup is unsuccessful, router 122 may return to client 102 an appropriate error message (e.g., "404 Error—Not Found").

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using network 100, components thereof, and/or any other system operable to implement method 400. In certain embodiments, method 400 may be implemented partially or fully in software and/or firmware embodied in computer-readable media.

In the embodiments represented by method 400, if a domain name is registered both locally on router 122 and is resolvable using DNS, router 122 resolves the domain name to the local information handling system as set forth in table 130. However, in some embodiments, if a domain name is registered both locally on router 122 and is resolvable using DNS, router 122 may, in response to receiving a URL from a client 102 including such domain name, respond to such client 102 with an appropriate message in regard to the conflict. For example, in such a conflict scenario, router 122 may serve a web page describing the conflict and allow a user of a client 102 to resolve the conflict (e.g., by selecting one of the two conflicted IP addresses, or re-registering a new local domain name to rectify the conflict).

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for resolving a uniform resource locator, comprising:

receiving, at a router, a uniform resource locator from a first information handling system within a local network of the router;

processing, by the router, the uniform resource locator to determine if the uniform resource locator includes a local domain name of a second information handling system within the local network;

responsive to a determination that the local domain name is resolvable to a third information handling system external to the local network in addition to being registered by the router, communicating an indication to the first information handling system that the local domain name is resolvable to the third information handling system external to the local network in addition to being registered by the router;

receiving, in response to the indication, a selection from a user of the first information handling system whether to resolve the uniform resource locator to the third information handling system external to the local network or the second information handling system; and resolving, by the router, a unique address associated with the uniform resource locator and the second information handling system responsive to determining that the uniform resource locator includes the local domain name of the second information handling system, wherein such resolving is performed without resort to a domain name service external to the router and is performed in accordance with the selection.

2. The method of claim 1, wherein the local network is defined as an Internet Protocol subnet of the router.

3. The method of claim 1, wherein the unique address is an Internet Protocol address.

4. The method of claim 1, wherein processing comprises determining whether the local domain name has been registered by the router.

5. The method of claim 1, wherein processing further comprises determining if the local domain name is resolvable to the third information handling system external to the local network in addition to being registered by the router.

6. The method of Claim 1, wherein the resolving comprises communicating an indication to the first information handling system that the local domain name is resolvable to the third information handling system external to the local network in addition to being registered by the router.

7. The method of claim 6, further comprising:
receiving, in response to the indication, a new domain name for the second information handling system; and
registering, by the router, the new domain name, wherein the new domain name is associated with the second information handling system.

8. An information handling system, comprising:
a processor; and
a program of instructions embodied in non-transitory computer-readable media and configured to, when executed by the processor:
receive a uniform resource locator from a first information handling system within a local network of the information handling system;
process the uniform resource locator to determine if the uniform resource locator includes a local domain name of a second information handling system within the local network;
responsive to a determination that the local domain name is resolvable to a third information handling system external to the local network in addition to being registered by the information handling system, communicating an indication to the first information handling system that the local domain name is resolvable to the third information handling system external to the local network in addition to being registered by the information handling system;
receiving, in response to the indication, a selection from a user of the first information handling system whether to resolve the uniform resource locator to the third information handling system external to the local network or the second information handling system; and
resolving a unique address associated with the uniform resource locator and the second information handling system responsive to determining that the uniform resource locator includes the local domain name of the second information handling system, wherein such resolving is performed without resort to a domain name service external to the router and is performed in accordance with the selection.

9. The information handling system of claim 8, wherein the local network is defined as an Internet Protocol subnet of the router.

10. The information handling system of claim 8, wherein the unique address is an Internet Protocol address.

11. The information handling system of claim 8, wherein the program of instructions is further configured to determine whether the local domain name has been registered by the router.

12. The information handling system of claim 8, wherein the program of instructions is further configured to:
receive, in response to the indication, a new domain name for the local second information handling system; and
register the new domain name, wherein the new domain name is associated with the local second information handling system.

13. An article of manufacture, comprising:
a non-transitory computer-readable medium; and
computer-executable instructions carried on the computer-readable medium, the instructions readable by a processor, the instructions, when read and executed, for causing the processor to:
receive a uniform resource locator from a first information handling system within a local network of the information handling system;
process the uniform resource locator to determine if the uniform resource locator includes a local domain name of a second information handling system within the local network;
responsive to a determination that the local domain name is resolvable to a third information handling system external to the local network in addition to being registered by the information handling system, communicating an indication to the first information handling system that the local domain name is resolvable to the third information handling system external to the local network in addition to being registered by the information handling system;
receiving, in response to the indication, a selection from a user of the first information handling system whether to resolve the uniform resource locator to the third information handling system external to the local network or the second information handling system; and
resolving a unique address associated with the uniform resource locator and the second information handling system responsive to determining that the uniform resource locator includes the local domain name of the second information handling system, wherein such resolving is performed without resort to a domain name service external to the router and is performed in accordance with the selection.

14. The article of claim 13, wherein the local network is defined as an Internet Protocol subnet of the router.

15. The article of claim 13, wherein the unique address is an Internet Protocol address.

16. The article of claim 13, the instructions for further causing the processor to determine whether the local domain name has been registered by the router.

17. The article of claim 13, the instructions for further causing the processor to:
receive, in response to the indication, a new domain name for the local second information handling system; and
register the new domain name, wherein the new domain name is associated with the local second information handling system.

* * * * *